United States Patent

Yamaguchi et al.

[11] Patent Number: 5,861,198
[45] Date of Patent: *Jan. 19, 1999

[54] LIQUID CRYSTAL DISPLAY DEVICE

[75] Inventors: Hidemasa Yamaguchi, Sayama; Fumie Nozawa, Asaka; Masami Ubukata, Tokorozawa, all of Japan

[73] Assignee: Hoechst Aktiengesellschaft, Frankfurt, Germany

[*] Notice: The portion of the term of this patent subsequent to Mar. 13, 2016, has been disclaimed.

[21] Appl. No.: 615,614

[22] Filed: Mar. 13, 1996

[30] Foreign Application Priority Data

Mar. 15, 1995 [JP] Japan ................................ 7-055981

[51] Int. Cl.$^6$ ................................ G02F 1/1337
[52] U.S. Cl. ................ 428/1; 252/299.01; 349/126; 349/128; 349/129; 349/186; 428/156; 428/412; 428/421; 428/423; 428/435; 428/447; 428/437.5; 428/474.4; 428/480
[58] Field of Search ................ 428/1, 447, 412, 428/421, 423.1, 435, 480, 473.5, 156, 474.4; 329/78; 252/299.01

[56] References Cited

U.S. PATENT DOCUMENTS

| | | | |
|---|---|---|---|
| 5,237,034 | 8/1993 | Im | 528/26 |
| 5,419,931 | 5/1995 | Asaoka | 428/1 |
| 5,477,360 | 12/1995 | Sunohara | 428/1 |
| 5,486,403 | 1/1996 | Ishitaka | 428/167 |

FOREIGN PATENT DOCUMENTS 0635748  1/1995  European Pat. Off. .

OTHER PUBLICATIONS

Patent Abstracts of Japan, vol. 014, No. 098 (P–1011), Feb. 22, 1990.
Patent Abstracts of Japan, vol. 018, No. 146 (P–1707), Mar. 10, 1994.
Journal of the Society for Information Display, vol. 2, No. 1, Apr. 1, 1994, pp. 31–36, XP000482980 by Sumiyoshi K. et al.

Koike et al., "A Full–Color TFT–LCD with a Domain–Divided Twisted–Nematic Structure", *SID 92 Digest:* 798–801 (1992).

Scheffer et al., "Accurate Determination of Liquid–Crystal Tilt Bias Angles", *Journal of Applied Physics* 48(5): 1783–1792 (1977).

Takatori et al., "Splayed TN Configuration Stablility in Multi–Domain TN Mode", Display Device Research Laboratory, Functional Devices Research Laboratories, NEC Corporation, pp. 7–12.

Toko et al., "TN–LCDs Fabricated by Non–Rubbing Showing Wide and Homogeneous Viewing Angular Characteristics and Excellent Voltage Holding Ratio", *SID 93 Digest:* 622–625 (1993).

Yang, K. H., "Two–Domain Twisted Nematic and Tilted Homeotropic Liquid Crystal Displays for Active Matrix Applications", *IDRC:* 68–72 (1991).

*Primary Examiner*—Nasser Ahmad
*Attorney, Agent, or Firm*—Frommer Lawrence & Haug LLP

[57] ABSTRACT

A liquid crystal display device having a liquid crystal material put between a pair of substrates each comprising a transparent electrode and an alignment layer formed thereon in such a manner that the alignment layers are arranged inside so as to face each other, characterized in that at least one of said pair of substrates has an alignment layer formed thereon, which is capable of forming two or more different alignment states of the liquid crystal by an aligning processing in one direction, and at least one of said pair of substrates has an alignment layer formed thereon which generates a pretilt angle of the liquid crystal of at least 2°. The device has a high contrast and less dependency of display characteristics on the viewing angle.

20 Claims, 1 Drawing Sheet

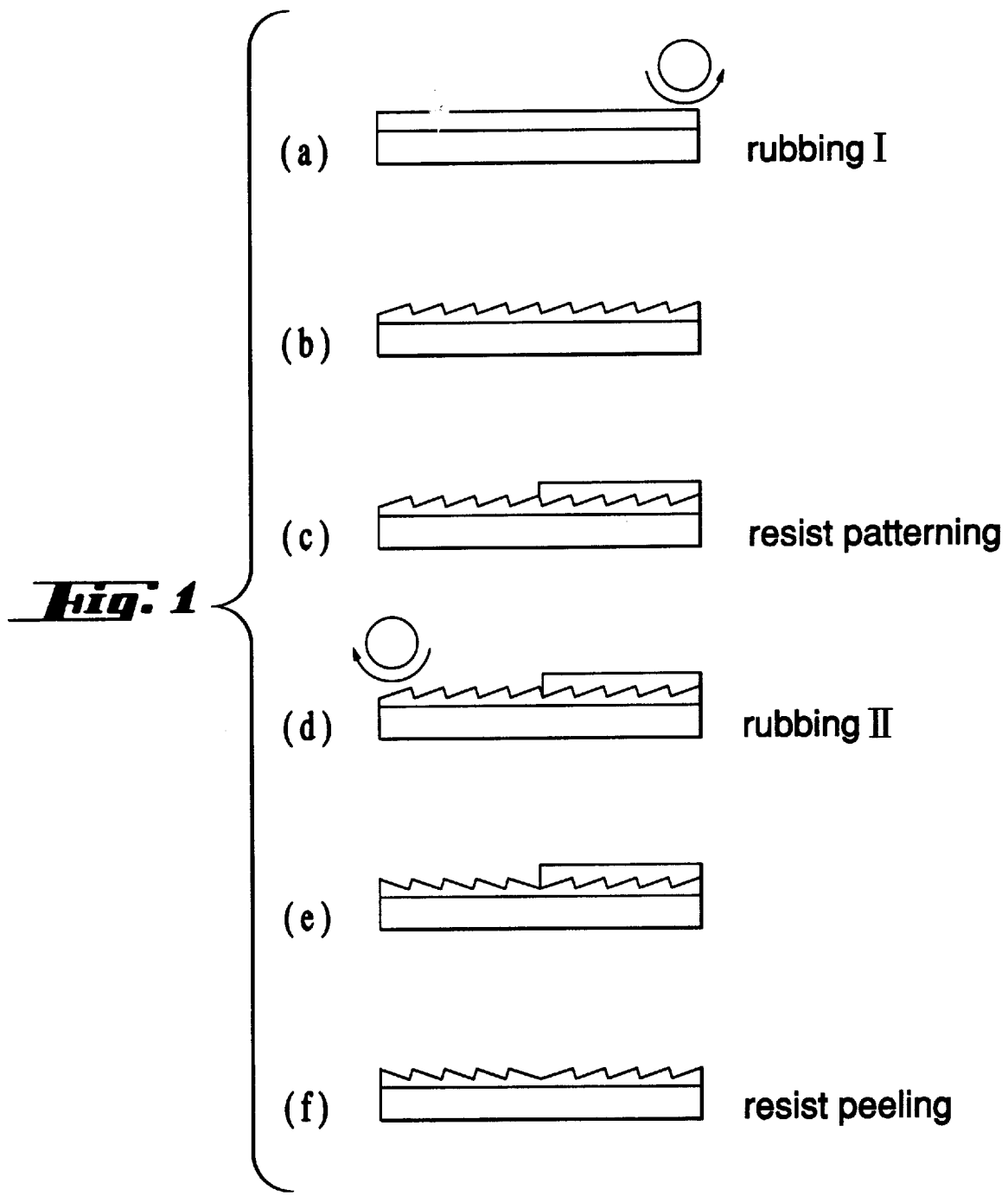

LIQUID CRYSTAL DISPLAY DEVICE

BACKGROUND OF THE INVENTION

1. Field of the Invention

This invention relates to an alignment layer for a liquid crystal display device and a liquid crystal display device provided with this alignment layer. More particularly, it relates to an alignment layer, by which an alignment state capable of giving a wide viewing angle can be controlled, and a liquid crystal display device wherein this alignment layer is used.

2. Description of the Related Art

A liquid crystal display device is an electro-optical device containing a liquid crystal material which undergoes changes in optical characteristics when an electrical field is externally applied. In recent years, liquid crystal display devices of the twisted nematic (TN) type have been widely applied to television sets, personal computers, etc., since they are thin and light weight and consume less electricity.

In a liquid crystal display device of the TN type, a liquid crystal alignment layer is formed on a substrate made of, for example, glass and the surface of the alignment layer is rubbed with a cloth, etc. so as to align liquid crystals, i.e., a so-called rubbing treatment. Namely, a liquid crystal alignment layer is obtained by forming a thin film of a heat-resistant polymer (for example, polyimide, polyamide) by spin coating, printing, dipping, etc. and drying or setting the polymer film followed by rubbing. In such a liquid crystal alignment layer, liquid crystal molecules are aligned in one direction while defining a pretilt angle of usually 2 to 4° from the surface of the substrate. Also, attempts have been made to produce alignment layers by obliquely depositing an organic substance (silicon oxide, etc.) onto a substrate (oblique deposition).

As a basic drawback, however, the characteristics of a liquid crystal display device are highly dependent on the viewing angle. That is to say, it suffers from serious problems including change of the contrast depending upon the viewing angle and black/white inversion of the display.

To overcome this problem in the viewing angle dependency, there have been recently proposed a liquid crystal display device provided with two regions, which differ from each other by 180° in the upstanding direction of liquid crystal molecule, in one image element (K. H. Yang, IDRC, p. 68, 1991, hereby incorporated by reference) and a liquid crystal display device provided with two regions, which differ from each other in pretilt angle, in one image element (Y. Koike, et al., SID, p. 798, 1992, hereby incorporated by reference). In these methods, however, two regions differing in alignment state should be formed in each of fine image elements, which requires photolithographic techniques, etc. Accordingly, such a method involves an elevated number of steps and a complicated process. It is therefore highly difficult to economically produce a liquid crystal display device at a high efficiency thereby. Although there has been proposed amorphous TN alignment which requires no rubbing process (Y. Toko, S. Kobayashi, et al., SID, p. 622, 1993, hereby incorporated by reference), this method suffers from a problem that the whole display has a deteriorated contrast.

Accordingly, it has been urgently required to develop a method for improving the viewing angle dependency by using an alignment layer material, thus solving these problems encountered in the prior art and providing a liquid crystal display device with a less viewing angle dependency.

OBJECTS OF THE INVENTION

Accordingly, an object of the present invention is to solve the above-mentioned problems by providing a liquid crystal alignment layer material and a liquid crystal display device which has good contrast and less viewing angle dependency.

The foregoing and other objects and advantages of the invention will be set forth in or apparent from the following description.

SUMMARY OF THE INVENTION

The present invention provides a liquid crystal display device having a liquid crystal material put between a pair of substrates each comprising a transparent electrode and an alignment layer formed thereon in such a manner that the alignment layers are arranged inside so as to face each other, characterized in that at least one of said pair of substrates has an alignment layer formed thereon, which is capable of forming two or more different alignment states of the liquid crystal by an aligning processing in one direction, and at least one of said pair of substrates has an alignment layer formed thereon which generates a pretilt angle of the liquid crystal of at least 2°. As used herein, a pretilt shall mean a pretilt angle measured by known methods such as crystal rotation method.

BRIEF DESCRIPTION OF THE DRAWINGS

FIG. 1 shows cross-sectional views of successive stages of an alignment resolution process using a photoresist technology, comprising the following steps (a) to (f):

| | |
|---|---|
| (a) | rubbing I |
| (b) | result of rubbing I |
| (c) | resist patterning |
| (d) | rubbing II |
| (e) | result of rubbing II |
| (f) | resist peeling. |

DESCRIPTION OF THE PREFERRED EMBODIMENTS

In the liquid crystal display device of the present invention, it is preferable that one of said pair of substrates has an alignment layer formed thereon, which is capable of forming two or more different alignment states of the liquid crystal by an aligning processing in one direction, while another substrate has an alignment layer formed thereon which forms one alignment state of the liquid crystal by an aligning processing in one direction and generates a pretilt angle of the liquid crystal of at least 2°. It is preferable that a difference in the pretilt angles generated by the alignment layers on the upper and lower substrates is at least 2°.

In the liquid crystal display device of the present invention, it is still preferable that the alignment layer, which is capable of forming two or more different alignment states of liquid crystal by an aligning processing in one direction, comprises two or more kinds of polymers, and a difference between the maximum SP value and the minimum SP value of the polymers is at least 1. It is still preferable that this alignment layer has microprotrusions on the surface thereof. It is still preferable that this alignment layer contains a polymer having a siloxane and/or a fluorine atom.

In the liquid crystal display device of the present invention, at least one of the substrates each having an alignment layer formed thereon may be provided with two regions in one pixel wherein the rubbing directions are opposite to each other.

By combining certain alignment layers with each other in accordance with the present invention, a liquid crystal display device can be obtained which has reduced inversion problems and has a good contrast and less dependency of the display characteristics on the viewing angle.

The liquid crystal display device of the present invention is characterized in that a first alignment layer, which is capable of forming two or more different alignment states of the liquid crystal by an aligning processing in one direction, is formed on one substrate. As used herein, the term "two or more different alignment states of the liquid crystal" means, for example, that there are two regions in the liquid crystal display device where the the twist direction of the liquid crystal molecule is clockwise or anticlockwise, and that a sprayed alignment state or two or more liquid crystal alignment states, which are different in a direction or degree of the pretilt angle of the liquid crystal molecule, are present.

For example, when two different liquid crystal alignment regions, the twist directions of the liquid crystal molecules thereof are clockwise and anticlockwise, are formed by an aligning processing in one direction, the viewing characteristics of these two alignment regions are shifted by 90° to each other in each direction. In this liquid crystal display device, therefore, the viewing angle characteristics is widened, compared with existing liquid crystal display devices of TN type having a single twist direction.

When two splayed alignment regions, which are shifted by 180° to each other in the upstanding direction of liquid crystal molecule upon application of a voltage, are formed, the viewing angle characteristics of these two alignment regions are shifted in a direction of 180°. As a result, the viewing angle characteristics is widened, compared with existing liquid crystal display devices of TN type having a single twist and upstanding direction. When a further region is formed wherein the twist directions of the liquid crystal molecules is opposite to the direction of splayed alignment, there are formed three or four regions. The viewing angle characteristics of these regions overlap each other, which further widens the viewing angle characteristics. A different splayed alignment region, wherein the upstanding direction of liquid crystal molecule is shifted to 180°, is formed when more than one regions are formed, wherein the pretilt angle of the upper substrate is larger than that of the lower substrate in one region, and the pretilt angle of the lower substrate is larger than that of the upper substrate in other regions.

Furthermore, when two or more regions differing in the direction or degree of the pretilt angle of liquid crystal molecule are formed by an aligning processing in one direction, the viewing angle characteristics of these regions overlap each other and thus the viewing angle characteristics are widened.

Such two or more liquid crystal alignment states can be established by, for example, blending at least two different polymers differing in SP value by at least 1 and forming microprotrusions with arbitrary size and shape on the surface of the alignment layer. The microprotrusions are from several hundred Å to several μm in size, i.e., in diameter, and from several hundred Å to several μm in height, preferably from several hundred Å to several thousand Å in height. Size and height of the microprotrusions can be measured by methods well known in the art, e.g., atomic force microscopy or scanning electron microscopy. In a typical case, at least one of these polymers differing in SP value serves as a base material amounting to 50% or more, while other polymer(s) are used as so-called dopant(s) to be blended with the base. Since the base polymer and the additive polymer(s) differ in SP value by at least 1, a phase separation is generated by mixing these polymers. That is to say, it is believed that the polymer(s) added form microphase separation structures on the base polymer, thus giving microprotrusions. The SP-value $\delta=(\Delta E/V)^{1/2}$ wherein $\Delta E$ is the molar heat of vaporization and V is the volume fraction (see, e.g., I. H. Hildebrand, R. L. Scott, The Solubility of Nonelectrolytes, 3rd Ed., Reinhold, N.Y., 1949, hereby incorporated by reference).

Such an alignment layer having a fine microphase separation structure and being capable of forming two or more liquid crystal alignment states can be produced by dissolving in a suitable solvent two or more polymers differing in SP value by at least 1, and forming a film of the resulting mixture on a glass or plastic substrate by spin coating or print coating. By forming such an alignment layer on one of the substrates, two or more alignment states with a high stability and a good reproducibility can be obtained.

By using an alignment layer capable of forming two or more different alignment states of liquid crystal, and by using an alignment layer having a pretilt angle of 2° or more on at least one substrate according to the present invention, disclination generated between two different regions, wherein the upstanding direction of the liquid crystal molecule upon application of a voltage is reversed to 180°, can be eliminated or fixed. Accordingly, a liquid crystal display device having a good contrast and no hysteresis can be obtained.

In the liquid crystal display device of the present invention, at least one of the substrates each having an alignment layer formed thereon may be provided with two regions in one pixel wherein the rubbing directions are opposite to each other. When there are two or more liquid crystal alignment states different from each other, the viewing angle characteristics in any direction can be further improved by providing two regions in one pixel wherein the rubbing directions are opposite to each other. For example, when two different regions, wherein the twist directions of the liquid crystal molecules are clockwise and anticlockwise, are formed by an aligning processing in one direction, four regions wherein the viewing angle characteristics are shifted to 90° in each direction can be formed by providing two regions in one pixel wherein the rubbing directions are opposite to each other. Thus, a display with good viewing angle characteristics at any direction (360°) can be achieved. Two regions in one pixel wherein the rubbing directions are opposite to each other can be formed by, for example, the alignment resolution method with the use of a photoresist employed by Y. Koike et al. as cited above.

The polymer to be used as the material for the alignment layer of the present invention can be selected from, but not limited to, those commonly employed in organic alignment layers such as polyimide, polyamide, polyurethane, polyester, polycarbonate, polyurea, polyether, polyimidoamide, polypeptide, polyolefins, cellulose and derivatives thereof, polyacrylates, polymethacrylates, polyvinyl such as polystyrene and polyvinyl alcohol. It is preferable that at least one of the polymers to be used as the material for the alignment layer of the present invention is a polymer containing siloxane or a polymer containing fluorine. The alignment layer can be produced by forming a thin film of the polymer on a glass or plastic substrate by spin coating or print coating in accordance with a method well known in the art.

The alignment layer, which is capable of forming two or more different alignment states of the liquid crystal, to be used in the present invention can be produced by selecting at least two different polymers differing in SP value by 1 or above, mixing these polymers and forming a thin film of the mixture on a glass or plastic substrate by spin coating or print coating.

Polyimide, polyamide, polyurethane, polyester, polycarbonate, polyether, polyimidoamide and polyurea can be obtained by polymerizing monomers (for example, diisocyanate, diol, dicarboxylic acid, diamine, tetracarboxylic anhydride) by a method which has been commonly known by those skilled in the art.

A polymer containing fluorine can be obtained by using a monomer substituted with fluorine atom(s).

Examples of cellulose and derivatives thereof include hydroxypropyl cellulose, cellulose, hydroxymethyl cellulose, cellulose acetate butyrate, cellulose acetate phthalate, cellulose triacetate, methyl cellulose, cellulose acetate, cellulose hydroxypeptide, p-aminobenzyl cellulose, polyethyleneimine cellulose, triethylaminoethyl cellulose, ethyl cellulose, cyanoethylated cellulose, carboxymethylated cellulose, diethylaminohydroxypropylated cellulose, sulfohydroxypropylated cellulose, trimethylaminohydroxypropylated cellulose and bromoacetyl cellulose.

Examples of polyvinyl and derivatives thereof include polystyrene, sodium poly-4-styrene sulfonate, polymethylstyrene, dicarboxy-terminated polystyrene, monocarboxy-terminated polystyrene, polystyrene divinylbenzene, polystyrene methyl methacrylate, 3-trifluoromethylstyrene, polyvinylalcohol, polyvinylbiphenyl, polyvinylbiphenylether, polyvinylcinnamate, polyvinylformal, polyacenaphthylene, polyvinylcarbazole, polyvinylcyclohexyl, polyvinylmethlketone, polyvinylnaphthalene, polyvinylphenol, polyvinylpyridine, polyvinylbutyral, polyvinylidenefluoride, polyvinylpyridine-N-oxide, polyvinylchloride, polyvinylfluoride and polystyrenesulfonylfluoride.

Examples of the polyacrylates or polymethacrylates include poly(methyl acrylate), poly(methyl methacrylate), poly(ethyl acrylate), poly(ethyl methacrylate), poly(butyl acrylate), poly(butyl methacrylate), poly(isobutyl acrylate), poly(isobutyl methacrylate), poly(t-butyl acrylate), poly(t-butyl methacrylate), poly(hexyl acrylate), poly(hexyl methacrylate), poly(2-ethylbutyl acrylate), poly(2-ethylbutyl methacrylate), poly(benzyl acrylate), poly(benzyl methacrylate), poly(cyclohexyl acrylate), poly(cyclohexyl methacrylate), poly(norbornyl acrylate), poly(norbornyl methacrylate), poly(isobornyl acrylate), poly(isobornyl methacrylate), poly(biphenyl acrylate), poly(biphenyl methacrylate) and copolymers thereof.

A fluorine atom-containing polymer can be obtained by introducing fluorine atom(s) into such a polyacrylate or polymethacrylate. As the polyolefins, use can be made of, for example, polyethylene, polypropylene, polyacetylene, polybutadiene, polyvinylidene fluoride and copolymers thereof. In addition thereto, polysilastyrene, etc. are also usable therefor.

As a siloxane-containing polymer, use can be made of polymers obtained by reacting a compound represented by the following general formula as a siloxane component. It is preferable to use a block polymer of siloxane with other polymer(s).

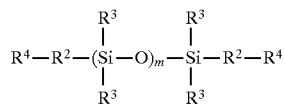

wherein m is an integer of 1 or above;

$R^2$ represents a divalent hydrocarbon group;

$R^3$ represents a monovalent, linear or branched, aliphatic hydrocarbon group having from 1 to 5 carbon atoms or an alicyclic or aromatic hydrocarbon group having from 4 to 14 carbon atoms; and $R^4$ represents —$NH_2$, —OH, —COOH, Ar(COOH)$_2$, Ar(CO)$_2$O or —NHSi(CH$_3$)$_3$, wherein Ar represents an aromatic group.

It is preferable that $R^2$ is a linear alkylene group having from 1 to 10 carbon atoms and that Ar has from 4 to 14 carbon atoms.

Examples of the aliphatic hydrocarbon group usable as $R^3$ include methyl, ethyl, propyl, isopropyl, n-butyl, t-butyl and pentyl groups. Examples of the alicyclic hydrocarbon group include cyclopropyl, cyclobutyl, cyclopentyl and cyclohexyl groups. Examples of the aromatic hydrocarbon group include phenyl, tolyl, xylyl, biphenyl, naphthyl, anthryl and phenanthryl groups. These aromatic rings may be substituted by, for example, halogen atoms, nitro groups or alkyl groups. $R^3$ may be different from each other. It is preferable that $R^3$ is a methyl group.

In the above formula, it is preferable that m is 2 or above, still preferably 8 or above. When the polymerization degree of polysiloxane is excessively high, however, there arises a tendency toward deterioration in the strength of the alignment layer material. It is therefore preferable that m is not more than 100.

EXAMPLES

To further illustrate the present invention in greater detail, and not by way of limitation, the following Examples will be given.

Example 1

A polymer represented by the following formula:

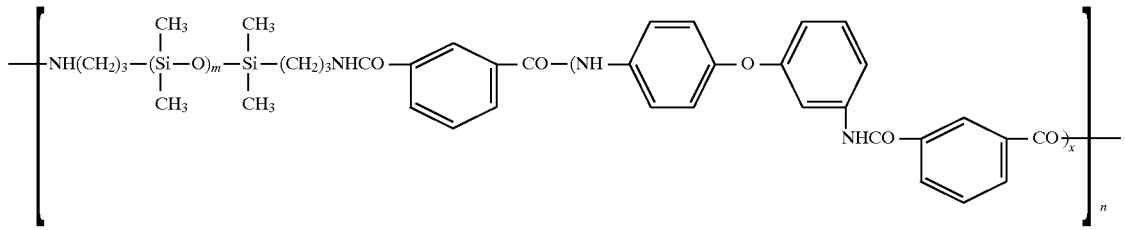

wherein m is 10 and an average polymerization degree X in the aramide moiety is 24 (SP value =13.1, hereinafter referred to as Polymer 1) and polycyclohexyl methacrylate (SP value=9.3, hereinafter referred to as Polymer 2) were mixed at a mixing ratio of 10:1. Then the resulting mixture was dissolved in a solvent mixture of n-methylpyrrolidone with butyl cellosolve (8:2) to give a polymer concentration of 2% by weight. The solution thus obtained was applied onto a glass plate, which was provided with a transparent electrode thereon, with a spinner at 2,000 rpm for 20 seconds. Then the coated plate was dried at 180° C. for 1 hour to form an alignment layer (A1). Next, the layer was subjected to an aligning processing by rubbing in one direction with a nylon cloth. Thus a lower substrate was prepared.

The film thickness of the alignment layer (A1) thus obtained was about 50 nm. When measured by the crystal rotation method (see, e.g., T. I. Scheffer and I. Nehring, Journal of Applied Physics 1977, 48, 1783, hereby incorporated by reference), the apparent pretilt angle of a nematic crystal on the alignment layer (A1) was 1°. The alignment layer (A1) had protrusions of from 50 to 300 nm in height and from 500 to 2,000 nm in size, here and subsequently measured by atomic force microscopy. It is capable of forming two or more alignment states of the liquid crystal by a single rubbing treatment.

Subsequently, an alignment layer (B1) was formed on a glass substrate, which was provided with a transparent electrode thereon, in the same manner as employed for the formation of the alignment layer (A1) but using a polymer of the above formula (1) wherein m was 38 and the average polymerization degree X of the aramide moiety was 81 (Polymer 3). Then the resulting layer was subjected to an aligning processing. Thus an upper substrate was prepared. The pretilt angle of a nematic liquid crystal on the alignment layer (B1) was 3.5°. When subjected to an aligning processing, this alignment layer B1) is capable of forming a single and uniform alignment state of the liquid crystal.

By using the upper and lower substrates prepared above, a twisted nematic type liquid crystal cell having a cell gap of 5.5 μm was prepared in such a manner that the angle of rubbing directions was 90°. Then the cell was filled with nematic liquid crystal (LIXON 5043XX, Chisso Co.) and subjected to a heat treatment at 110° C. for 30 minutes. Thus the cell showed a domain structure of from 50 to 100 μm which was composed of the regions of a right-handed and left-handed twisting direction. When a rectangular pulse of 5 V and 30 Hz was applied to this cell, no reverse tilt disclination line was generated. Further, the two regions showed characteristics of the viewing directions shifted to 90° from each other. Thus a direction with a good contrast was widened compared to a cell with a single alignment. When ZLI 4792 (Merck Co, and Inc.) was used as the liquid crystal, similar results were obtained.

Comparative Example 1

By using a pair of substrates coated with the alignment layer (A1) described in Example 1, a twisted nematic type liquid crystal cell having a cell gap of 5.5 μm was prepared in such a manner that an angle of rubbing directions was 90°. When nematic liquid crystal (LIXON 5043XX, Chisso Co.) was filled into the cell, the cell showed a domain structure of from 50 to 100 μm which was composed of the regions of a right-handed and left-handed twisting direction. Then a rectangular pulse of 5 V and 30 Hz was applied to this cell. Thus a reverse tilt disclination line was generated. This disclination was not fixed but moved with the passage of time and partly disappeared. It is known that such a disclination causes an ghost image phenomenon and deteriorates the contrast.

Comparative Example 2

An alignment layer (B2) was formed by the method described in Example 1 but replacing Polymer 3 with Polymer 1 (pretilt angle: 1°). Then a cell was prepared in the same manner as described in Example 1 but using this alignment layer (B2) and the alignment layer (A1) of Example 1, and the characteristics of the cell were evaluated. It was found that the cell had a widened viewing angle but suffered from the generation of a reverse tilt disclination.

Example 2

An upper alignment layer (A2) was formed as described in Example 1 but replacing Polymer 1 with Polymer 3 and using a mixture of Polymer 2 and Polymer 3. The alignment layer (A2) thus obtained had an apparent pretilt angle of 3°, and was capable of forming two or more alignment states of liquid crystal by a single aligning processing. Then a cell was prepared in the same manner as described in Example 1 but using this alignment layer (A2) and the alignment layer (B1) of Example 1, and the characteristics of the cell were evaluated. It was found that the cell had a widened viewing angle. Although a reverse tilt disclination was generated, the amount of the disclination generation was low compared with those of Comparative Examples 1 and 2. The disclination mostly disappeared at an early stage.

Example 3

A cell was prepared in the same manner as described in Example 1 but using the alignment layer (A2) in Example 2 as upper and lower substrates, and the characteristics of the cell were evaluated. It was found that the cell had a widened viewing angle. Although a reverse tilt disclination was generated, the amount of the disclination generation was low compared with those in Comparative Examples 1 and 2. The disclination mostly disappeared at an early stage.

Example 4

A cell was prepared in the same manner as described in Example 1 but using the alignment layer (A1) in Example 1 and the alignment layer (A2) in Example 2, and the characteristics of the cell were evaluated. It was found that the cell had a widened viewing angle. Although a reverse tilt disclination was generated, the amount of the disclination generation was low compared with those in Comparative Examples 1 and 2. The disclination mostly disappeared at an early stage.

Example 5

A cell was prepared in the same manner as described in Example 1 but using the alignment layer (A2) in Example 2 and the alignment layer (B2) in Comparative Example 2 respectively as the upper substrate and the lower substrate, and the characteristics of the cell were evaluated. It was found that the cell had a widened viewing angle. Although a reverse tilt disclination was generated, the amount of the desclination generation was low compared with those in Comparative Examples 1 and 2. The disclination mostly disappeared at an early stage.

Example 6

An alignment layer (A3) was formed by using polysilastyrene (SP=11.1) as a substitute for Polymer 2 in Example 1. This alignment layer (A3) had a film thickness of about 50 nm. When measured by the crystal rotation method, the apparent pretilt angle of nematic liquid crystal on this alignment layer (A3) was 1°. Two or more liquid crystal alignments could be formed by a single rubbing treatment.

Example 1, then the characteristics of the cell were evaluated. The results thus obtained were similar to those of Example 1.

Example 9

An alignment layer (A6) was formed by using a polymer represented by the following formula:

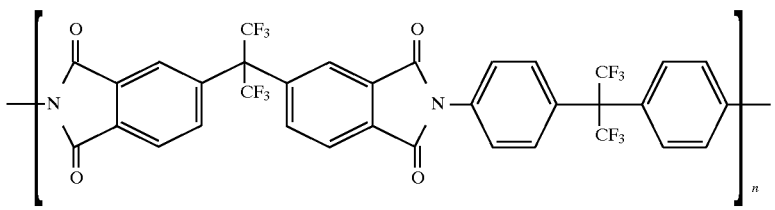

A cell was prepared in the same manner as described in Example 1 but using this alignment layer (A3) and the alignment layer (B1) in Example 1, then the characteristics of the cell were evaluated. The results thus obtained were similar to those of Example 1.

Example 7

An alignment layer (A4) was formed by using ethylhydroxyethyl cellulose (SP=9.3) as a substitute for Polymer 2 in Example 1. This alignment layer (A4) had a film thickness of about 50 nm. When measured by the crystal rotation method, the apparent pretilt angle of nematic liquid crystal on this alignment layer (A4) was 1°. Two or more liquid crystal alignments could be formed by a single rubbing treatment. A cell was prepared in the same manner as described in Example 1 but using this alignment layer (A4) and the alignment layer (B1) in Example 1, then the characteristics of the cell were evaluated. The results thus obtained were similar to those of Example 1.

as a substitute for Polymer 2 in Example 1. This alignment layer (A6) had a film thickness of about 50 nm. When measured by the crystal rotation method, the apparent pretilt angle of nematic liquid crystal on this alignment layer (A6) was 1°. Two or more liquid crystal alignments could be formed by a single rubbing treatment. A cell was prepared in the same manner as described in Example 1 but using this alignment layer (A6) and the alignment layer (B1) in Example 1, then the characteristics of the cell were evaluated. The results thus obtained were similar to those of Example 1.

Example 10

An alignment layer (A7) was formed by using a polymer represented by the following formula:

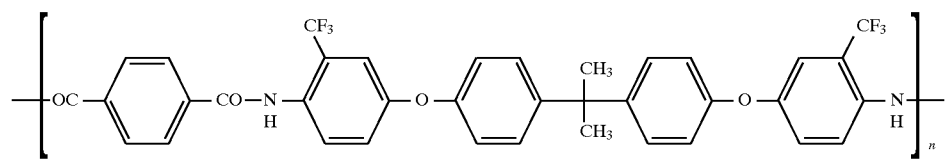

Example 8

An alignment layer (A5) was formed by using a polymer represented by the following formula:

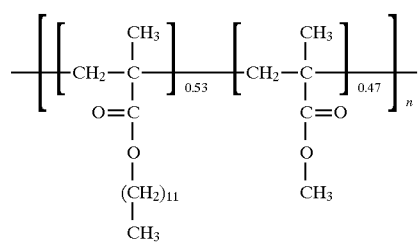

as a substitute for Polymer 2 in Example 1. This alignment layer (A5) had a film thickness of about 50 nm. When measured by the crystal rotation method, the apparent pretilt angle of nematic liquid crystal on this alignment layer (A5) was 1°. Two or more liquid crystal alignments could be formed by a single rubbing treatment. A cell was prepared in the same manner as described in Example 1 but using this alignment layer (A5) and the alignment layer (B1) in as a substitute for Polymer 1 in Example 1. This alignment layer (A7) had a film thickness of about 50 nm. When measured by the crystal rotation method, the apparent pretilt angle of nematic liquid crystal on this alignment layer (A7) was 1°. Two or more liquid crystal alignments could be formed by a single rubbing treatment. A cell was prepared in the same manner as described in Example 1 but using this alignment layer (A7) and the alignment layer (B1) in Example 1, then the characteristics of the cell were evaluated. The results thus obtained were similar to those of Example 1.

Example 11

An alignment layer (B3) was obtained by processing an SiO oblique deposition film, which was employed as a substitute for the alignment layer (B1) in Example 1, under the following conditions. The deposition angle, the degree of vacuum at the deposition and the deposition rate were respectively 75°, $1\times10^{-5}$ torr and 7 Å/sec. The film had a thickness of 800 Å and a pretilt angle of about 15°. A cell was prepared in the same manner as described in Example 1 but using the alignment layer (A1) in Example 1 and this alignment layer (B3), then the characteristics of the cell were evaluated. The results thus obtained were similar to those of Example 1.

Example 12

As a substitute for the alignment layer (B1) of Example 1, DE-7210 (pretilt angle: 5°, Nissan Chemical Industries, Ltd.) was used as an alignment layer (B4). A cell was prepared in the same manner as described in Example 1 but using the alignment layer (A1) in Example 1 and this alignment layer (B4), followed by the evaluation of the characteristics of the cell. The results thus obtained were similar to those of Example 1.

Example 13

Alignment resolution was performed by using a photoresist. An alignment layer (B1) was formed in the same manner as described in Example 1 followed by the rubbing treatment. In accordance with the process shown in FIG. 1, the photoresist was applied onto the whole surface of the alignment layer which was then exposed with the use of a photomask and developed. Subsequently, it was subjected to a rubbing treatment in the opposite direction to the one of the first rubbing treatment. After peeling off the remaining photoresist, an alignment layer (B5) was obtained. A liquid crystal display device was formed by using this alignment layer (B5) in the same manner as described in Example 1 and the characteristics thereof were evaluated. By this process, four regions wherein the viewing angle characteristics were shifted in 90° to each other were formed, and thus the viewing angle direction with a good contrast of the whole panel was widened. Upon application of a voltage, a reverse tilt disclination was generated only at the resolution boundary, which was a fixed site. Accordingly, a liquid crystal display device having further improved viewing angle characteristics can be obtained by the alignment resolution using a photoresist technology.

The above description of the invention is intended to be illustrative and not limiting. Various changes or modifications in the embodiments described may occur to those skilled in the art. These can be made without departing from the spirit or scope of the invention.

We claim:

1. A nematic liquid crystal display device comprising a liquid crystal material between a first substrate and a second substrate, wherein said first substrate and said second substrate each comprise a transparent electrode and an alignment layer formed thereon in such a manner that the alignment layers are arranged inside so as to face each other and at least one of said substrates has an alignment layer formed thereon which forms two or more different alignment states of the liquid crystal by an aligning processing in one direction, and at least one of said substrates has an alignment layer formed thereon which generates a pretilt angle of the liquid crystal of at least 2°.

2. A nematic liquid crystal display device as claimed in claim 1, wherein said first substrate has an alignment layer formed thereon which forms two or more different alignment states of the liquid crystal by an aligning processing in one direction and said second substrate has an alignment layer formed thereon which forms one alignment state of the liquid crystal by an aligning processing in one direction and generates a pretilt angle of the liquid crystal of at least 2°.

3. A nematic liquid crystal display device as claimed in claim 1, wherein the difference in the pretilt angles generated by the alignment layers on the first and second substrates is at least 2°.

4. A nematic liquid crystal display device as claimed in claim 1, wherein the alignment layer which forms two or more different alignment states of liquid crystal by an aligning processing in one direction, comprises two or more kinds of polymers, and a difference between the maximum SP value and the minimum SP value of the polymers is at least 1.

5. A nematic liquid crystal display device as claimed in claim 4, wherein the alignment layer, which forms two or more different alignment states of liquid crystal by an aligning processing in one direction, has microprotrusions on the surface thereof.

6. A nematic liquid crystal display device as claimed in claim 1, wherein the alignment layer, which forms two or more different alignment states of liquid crystal by an aligning processing in one direction, contains a polymer having a siloxane unit and/or a fluorine atom.

7. A nematic liquid crystal display device as claimed in claim 1, wherein at least one of said substrates includes an alignment layer having two regions provided in one image element, wherein the rubbing directions of said two regions are opposite to each other.

8. A nematic liquid crystal display device as claimed in claim 5, wherein said microprotrusions have a size from 500 angstroms to 10 microns and a height from 500 angstroms to 10 microns.

9. A nematic liquid crystal display device as claimed in claim 4, wherein said polymers include at least one dopant polymer blended with at least one base polymer material, wherein said base polymer material amounts to at least 50% of the liquid crystal alignment layer and has a SP value that differs by 1 or more from said dopant polymers in said alignment layer.

10. A nematic liquid crystal display device as claimed in claim 9, wherein said dopant polymers are blended with said base polymer material to result in a phase separation.

11. A nematic liquid crystal display device as claimed in claim 4, wherein at least one of said polymers is selected from the group consisting of polyimide, polyamide, polyurethane, polyester, polycarbonate, polyurea, polyether, polyimidoamide, polypeptide, polyolefins, cellulose and derivatives thereof, polyacrylates, polymethacrylates and polyvinyl.

12. A nematic liquid crystal display device as claimed in claim 4, wherein at least one of said polymers is a block polymer of siloxane of the following formula:

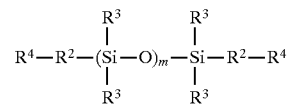

wherein m is an integer of 1 or above;

R$^2$ represents a divalent hydrocarbon group;

R$^3$ represents a monovalent, linear or branched, aliphatic hydrocarbon group having from 1 to 5 carbon atoms or an alicyclic or aromatic hydrocarbon group having from 4 to 14 carbon atoms; and R$^4$ represents —NH$_2$, —OH, —COOH, Ar(COOH)$_2$, AR(CO)$_2$O or —NHSi(H$_3$)$_3$, wherein Ar represents an aromatic group.

13. A nematic liquid crystal display device as claimed in claim 12, wherein R$^2$ is a linear alkylene group having from 1 to 10 carbon atoms.

14. A nematic liquid crystal display device as claimed in claim 12, wherein Ar is an aromatic group having from 4 to 14 carbons.

15. A nematic liquid crystal display device as claimed in claim 12, wherein R$^3$ is an aliphatic hydrocarbon group selected from the group consisting of methyl, ethyl, propyl, isopropyl, n-butyl, t-butyl and pentyl.

16. A nematic liquid crystal display device as claimed in claim 12, wherein $R^3$ is a methyl group.

17. A nematic liquid crystal display device as recited in claim 12, wherein m is at least 2.

18. A nematic liquid crystal display device as recited in claim 12, wherein m is at least 8.

19. A nematic liquid crystal display device as recited in claim 12, wherein m ranges from 2 to 100.

20. A nematic liquid crystal display device as recited in claim 4, wherein said polymers include a base polymer material in an amount greater than 50%.

* * * * *